United States Patent
Kozak et al.

(10) Patent No.: US 10,275,932 B2
(45) Date of Patent: Apr. 30, 2019

(54) METHODS AND APPARATUS FOR IMAGE ADJUSTMENT FOR DISPLAYS HAVING 2D AND 3D DISPLAY MODES

(71) Applicant: DOLBY LABORATORIES LICENSING CORPORATION, San Francisco, CA (US)

(72) Inventors: Eric Kozak, Burnaby (CA); Robin Atkins, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 395 days.

(21) Appl. No.: 14/638,546

(22) Filed: Mar. 4, 2015

(65) Prior Publication Data

US 2015/0178981 A1 Jun. 25, 2015

Related U.S. Application Data

(63) Continuation of application No. 13/991,447, filed as application No. PCT/US2011/058433 on Oct. 28, 2011, now abandoned.

(Continued)

(51) Int. Cl.
*G02B 27/22* (2018.01)
*G06T 15/20* (2011.01)
(Continued)

(52) U.S. Cl.
CPC .............. *G06T 15/20* (2013.01); *G06T 7/90* (2017.01); *G09G 3/003* (2013.01); *H04N 13/106* (2018.05); *H04N 13/324* (2018.05); *H04N 13/332* (2018.05); *H04N 13/356* (2018.05); *H04N 13/359* (2018.05); *H04N 13/398* (2018.05); *H04N 13/178* (2018.05);
(Continued)

(58) Field of Classification Search
CPC ........ G02B 27/2262; H04N 13/04; G01S 7/20
USPC .......................................................... 348/56
See application file for complete search history.

(56) References Cited

U.S. PATENT DOCUMENTS 5,604,529 A * 2/1997 Kuga .................. H04N 19/597
348/46
6,812,931 B2 11/2004 Wada
(Continued)

FOREIGN PATENT DOCUMENTS

AU 5416601 1/2003
GB 2428857 2/2007
(Continued)

OTHER PUBLICATIONS

Shirley, P. et al. "Photorealistic Rendering Techniques" pp. 7-20, Springer-Verlag Berlin Heidelberg, New York, 1994.

*Primary Examiner* — Mehrdad Dastouri
*Assistant Examiner* — Kristin Dobbs

(57) ABSTRACT

Embodiments of the invention relate to a display operable in 2D and 3D display modes. Methods and apparatus are provided for adjusting the colors and brightness of the image data and/or intensity of the display backlight based on the current display mode and/or color-grading of the image data. For example, when switching to a 3D display mode a color mapping may be performed on left and right eye image data to increase color saturation in particular regions, and/or the backlight intensity may be increased in particular regions to compensate for lower light levels in 3D display mode.

19 Claims, 5 Drawing Sheets

Related U.S. Application Data

(60) Provisional application No. 61/420,289, filed on Dec. 6, 2010.

(51) Int. Cl.
    *H04N 13/359* (2018.01)
    *G09G 3/00* (2006.01)
    *G06T 7/90* (2017.01)
    *H04N 13/324* (2018.01)
    *H04N 13/356* (2018.01)
    *H04N 13/332* (2018.01)
    *H04N 13/106* (2018.01)
    *H04N 13/398* (2018.01)
    *H04N 13/337* (2018.01)
    *H04N 13/341* (2018.01)
    *H04N 13/334* (2018.01)
    *H04N 13/178* (2018.01)

(52) U.S. Cl.
    CPC ......... *H04N 13/334* (2018.05); *H04N 13/337* (2018.05); *H04N 13/341* (2018.05)

(56) References Cited

U.S. PATENT DOCUMENTS

| | | | |
|---|---|---|---|
| 7,515,160 | B2 | 4/2009 | Kerofsky |
| 7,540,643 | B2 | 6/2009 | Hu |
| 7,619,604 | B2 | 11/2009 | Karman |
| 8,217,970 | B2 | 7/2012 | Whitehead |
| 8,471,807 | B2 | 6/2013 | Seetzen |
| 2004/0218269 | A1* | 11/2004 | Divelbiss ........... H04N 13/0029 359/464 |
| 2005/0057484 | A1 | 3/2005 | Diefenbaugh |
| 2005/0078108 | A1 | 4/2005 | Swift |
| 2007/0008617 | A1 | 1/2007 | Shestak |
| 2007/0165304 | A1 | 7/2007 | Tomita |
| 2007/0188711 | A1 | 8/2007 | Sharp |
| 2008/0013001 | A1 | 1/2008 | Jang |
| 2008/0030629 | A1 | 2/2008 | Toyooka |
| 2008/0218468 | A1 | 9/2008 | Kim |
| 2008/0231639 | A1 | 9/2008 | Matsushima |
| 2009/0109232 | A1 | 4/2009 | Kerofsky |
| 2009/0109233 | A1 | 4/2009 | Kerofsky |
| 2009/0190095 | A1 | 7/2009 | Ellinger |
| 2009/0244387 | A1 | 10/2009 | Lee |
| 2009/0295705 | A1 | 12/2009 | Chen |
| 2010/0208044 | A1* | 8/2010 | Robinson ........... H04N 13/0497 348/53 |
| 2011/0090216 | A1* | 4/2011 | Yamada ................ G06T 7/0059 345/419 |
| 2011/0285962 | A1* | 11/2011 | Ellinger ............. G02B 27/2207 353/7 |
| 2011/0316973 | A1 | 12/2011 | Miller |

FOREIGN PATENT DOCUMENTS

| | | |
|---|---|---|
| KR | 2006-0076609 | 7/2006 |
| KR | 2007-0047963 | 5/2007 |
| KR | 2007-0108986 | 11/2007 |
| KR | 2008-0113694 | 12/2008 |
| KR | 10-0887673 | 3/2009 |
| WO | 2002/069030 | 9/2002 |
| WO | 2003/077013 | 9/2003 |
| WO | 2006/010244 | 2/2006 |

\* cited by examiner

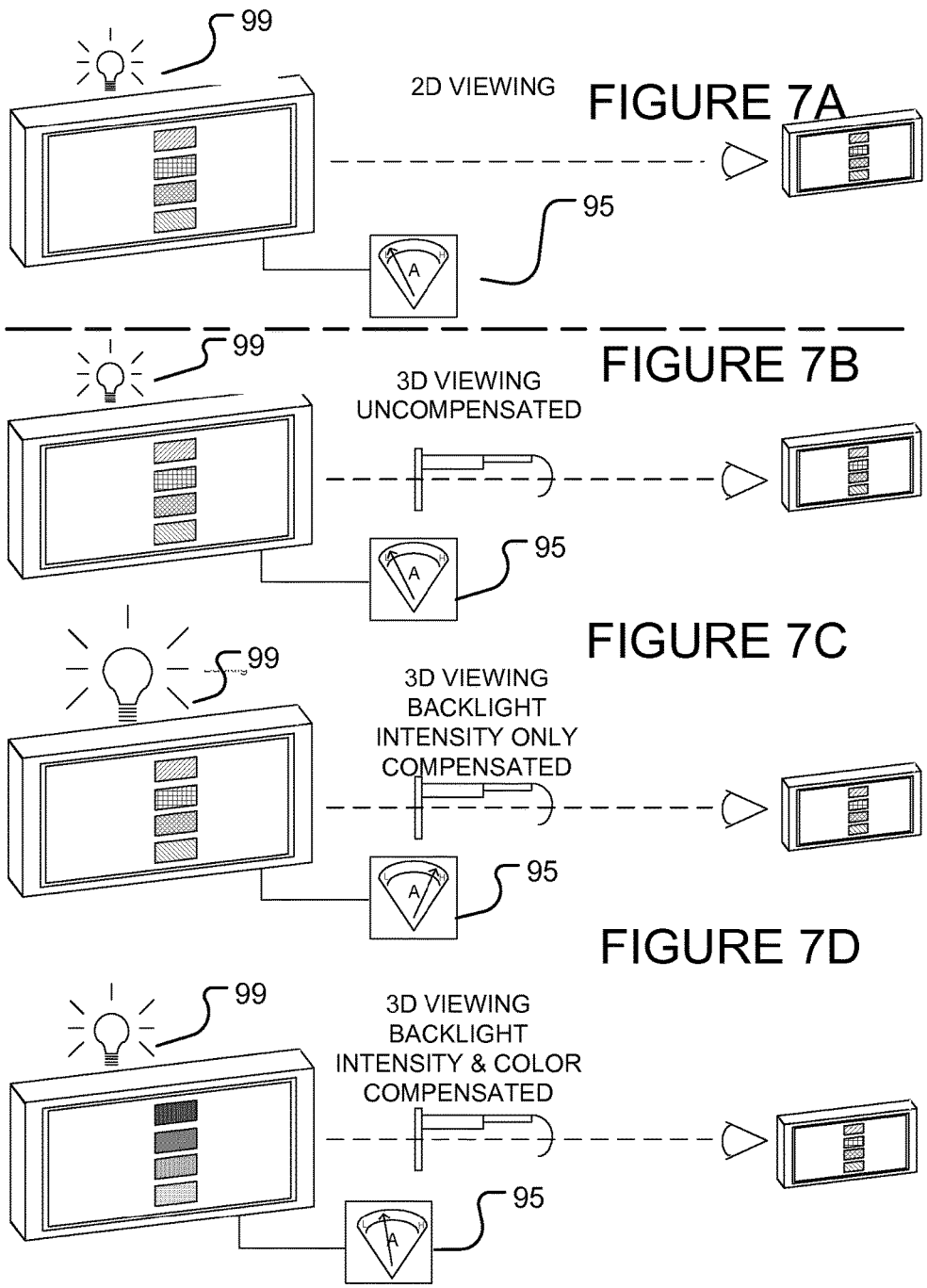

METHODS AND APPARATUS FOR IMAGE ADJUSTMENT FOR DISPLAYS HAVING 2D AND 3D DISPLAY MODES

CROSS-REFERENCE TO RELATED APPLICATIONS

This application is a continuation of U.S. patent application Ser. No. 13/991,447, filed Jun. 4, 2013, which is the U.S. national stage of International Patent Application No. PCT/US2011/058433, filed Oct. 28, 2011, which in turn claims priority to U.S. Provisional Patent Application No. 61/420,289 filed Dec. 6, 2010, each of which are hereby incorporated by reference in their entirety.

TECHNICAL FIELD

This invention relates to displays such as televisions and computer monitors and the like of the type which have two-dimensional (2D) and three-dimensional (3D) or stereoscopic display modes.

BACKGROUND

Some displays have a 3D display mode in which the display is operable to display 3D image data. In 3D display mode, a 3D visual effect may be generated by operating the display to deliver a different image to each eye of the viewer. The left and right eye images represent different perspectives of the same scene or object. The viewer's brain combines and interprets the left and right eye images to perceive a single 3D image having the illusion of depth.

Various display technologies exist for delivering different images to the left and right eyes of the viewer. For example, in active 3D viewing technologies, the viewer may wear eyeglasses including optical shutters that are operated in synchronization with the display to allow only one eye to view the display at a time. The display is operated to show an image for viewing by the viewer's left eye while the left eye shutter is opened and the right eye shutter is closed. Then the left eye shutter is closed and the right eye shutter is opened while the display is operated to display an image for viewing by the viewer's right eye. The switches occur quickly enough that they are not perceptible to the viewer.

In other technologies, such as passive viewing technologies, the viewer may wear spectral filtration eyeglasses to view different left and right eye images. The display is operated to provide spectrally filtered light to the viewer so that the left eye is presented with light in a first set of spectral bands (providing a left eye image) and the right eye is presented with light in a complementary, second set of spectral bands (providing a right eye image).

In other passive viewing technologies, the viewer may wear polarized eyeglasses having polarizing filters (e.g. linearly polarized eyeglasses or circularly polarized eyeglasses). Images for viewing by the viewer's left and right eyes are each polarized so that they can be seen by the intended eye but not the other eye when wearing the polarized eyeglasses.

In addition to the above-noted technologies, other technologies exist for delivering different images to each eye to provide a 3D viewing experience.

A problem that the inventors have identified in providing a 3D-capable display is that the brightness and color of the image may be significantly altered when the display is switched between 2D and 3D display modes. For example, because 3D image display provides about half of the light to each eye as compared to 2D image display, and color shifts may be introduced by the spectral properties of 3D optical shutters or spectral or polarizing filters and lenses, an image displayed in 3D display mode may appear to the viewer as being dimmer, duller, and/or in different colors, than the same image displayed in 2D display mode. It is desirable to provide a display which offers a viewing experience which has relatively more uniform brightness and color when switching between 2D and 3D display modes than is provided by current displays.

The foregoing examples of the related art and limitations related thereto are intended to be illustrative and not exclusive. Other limitations of the related art will become apparent to those of skill in the art upon a reading of the specification and a study of the drawings.

SUMMARY

This invention has a wide range of aspects. One aspect of the invention provides displays which have 2D and 3D display modes and which provide image adjustment upon switching between the modes. In some embodiments, the displays are of a type which has a backlight which can illuminate an LCD panel or other modulator with a pattern of light which is based on image data. In some such displays, the display performs image adjustment by making pixel value transformations in the image data and/or adjusting the backlight intensity. The image adjustment may be based on the current display mode (i.e. 2D or 3D display mode) and/or the display mode for which the image data has been color-graded.

Another aspect of the invention provides methods for operating a display having 2D and 3D display modes. When switching to the 3D display mode, a color mapping is performed on the left and right image data prior to displaying the left and right image data for viewing by the viewer's left and right eyes respectively. In such color mapping the color saturation may be increased for 3D display mode. Where the display is a backlit display, the backlight intensity may be increased in 3D display mode.

In addition to the exemplary aspects and embodiments described above, further aspects and embodiments will become apparent by reference to the drawings and by study of the following detailed descriptions.

BRIEF DESCRIPTION OF DRAWINGS

FIGS. 7A through 7D illustrate changes in the viewer's perceived colorfulness and luminance of a backlit display for different scenarios.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
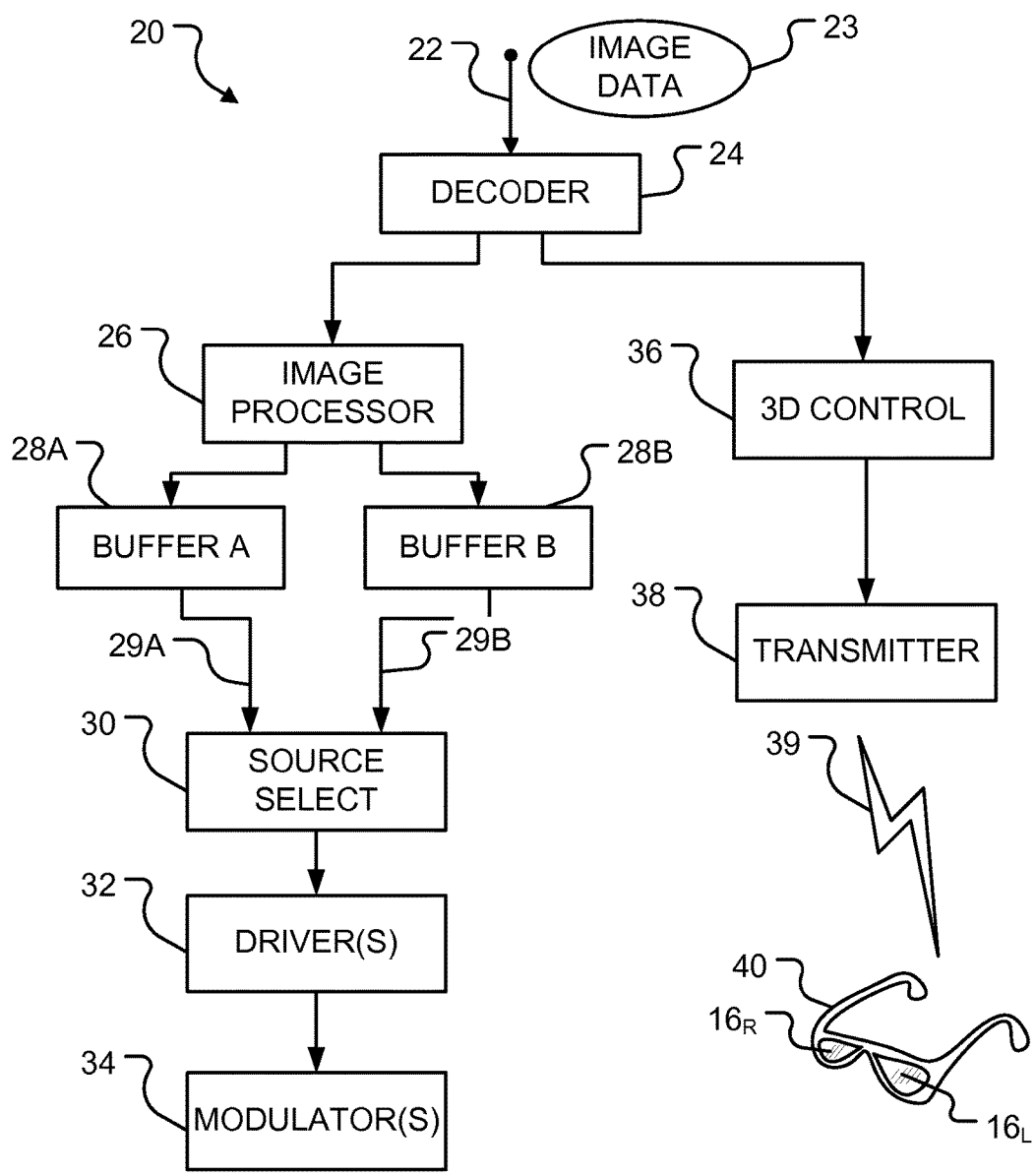
FIG. 1 is a schematic illustration of a display operable in 2D and 3D display modes according to one example embodiment.

FIG. 1 schematically illustrates a display 20 according to an example embodiment. As explained in further detail below, display 20 can operate between 2D and 3D display modes.

Display 20 may comprise a 3D-capable display such as, for example, a television, computer monitor, home cinema display, a dedicated display on devices such as tablet computers, mobile devices or the like, or a specialized display such as a display for medical imaging, virtual reality, vehicle simulation advertising or the like. Display 20 comprises an input 22 for receiving image data 23 to be displayed. Image data 23 is supplied to a decoder 24 which decodes the image data.

Figure 2:
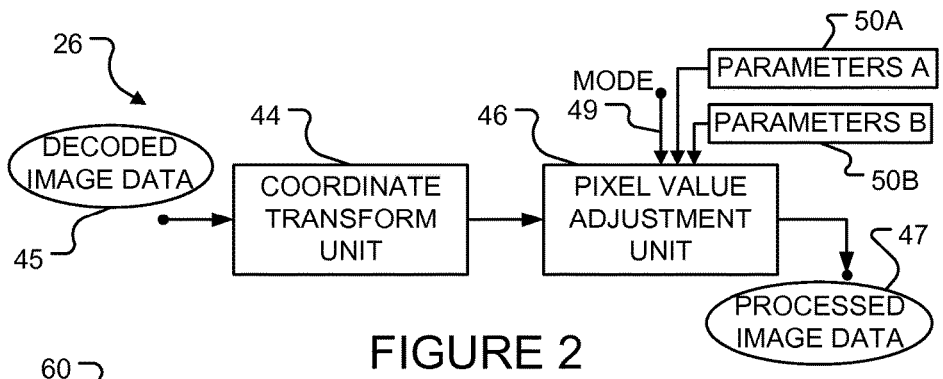
FIG. 2 is a schematic illustration of an image processor according to one example embodiment that may be used in the FIG. 1 display.

Decoded image data is passed to an image processor 26 which may manipulate the pixel values of the image data. FIG. 2 illustrates an example embodiment of an image processor 26 which receives and processes decoded image data 45 to provide processed image data 47. As shown in FIG. 2, image processor 26 has a coordinate transform unit 44 which optionally transforms the image data from one color space representation to another. For example, in some embodiments pixel value adjustments are performed in R, G, B color space, and where input image data is not provided in R, G, B format, coordinate transform unit 44 may transform the image data to an R, G, B representation to facilitate subsequent pixel value adjustments. Image processor 26 also has a pixel value adjustment unit or color mapping unit 46 which, based on the current display mode 49 of display 20 (e.g. 2D or 3D display mode), clips or otherwise adjusts color coordinates that are outside of the gamut of the display 20 and applies modifications of chromaticity and/or brightness in response to control settings and/or parameters 50A, 50B, or the like.

Image processor 26 may comprise a central processing unit (CPU), one or more microprocessors, one or more FPGAs, image processing circuits, or any other suitable processing unit(s) comprising hardware and/or software configured for functioning as described herein. Image processor 26 may implement the methods described herein (e.g. as described with reference to FIGS. 2 and 3) by executing software instructions provided by software functions. Such software functions may be stored in a program memory, but this is not necessary and the software functions may be stored in other suitable memory locations within or accessible to image processor 26. In some embodiments, one or more of the software functions or portions of the software functions may alternatively be implemented by suitably configured data processing hardware. In other embodiments one or more logic circuits are configured to perform the methods described herein as image data is supplied to the logic circuits.

Processed image data 47 (the output of image processor 26) is passed to buffers 28A, 28B (see FIG. 1) which hold current image data to be displayed on one or more modulators 34. The image data then passes through source select 30 to one or more driving circuits 32 which drive the modulator(s) 34 to display the image for viewing by a viewer in a viewing area.

Image data 23 may include 2D image content. In the illustrated embodiment, when display 20 is operating in 2D display mode, image data 23 which has been processed by image processor 26 may be passed to buffer 28A, then through source select 30 to driving circuits 32, which drive the modulator(s) 34 to display the image.

Image data 23 may include 3D image content. 3D image data contains different data for viewing by each eye of a viewer. Where image data 23 includes 3D image content, display 20 may optionally be operated in 3D display mode to display the 3D image content so that a viewer may perceive three dimensional details in the viewed image. In some cases image data 23 may comprise two separate streams of data. When display 20 is operating in 2D display mode, one stream may be displayed on its own. When display 20 is operating in 3D display mode, one stream may be used to display an image visible to one eye of a viewer while the other stream may be used to display an image visible to the other eye of the viewer. Some other image data formats may provide three data streams, including one data stream for use in a 2D display mode and two separate data streams for use in a 3D display mode. The separate data streams may individually, or in combination with the 2D image stream, specify image data for viewing by each eye of a viewer.

In the illustrated embodiment, when display 20 is operating in 3D display mode, image processor 26 delivers frames in alternation to a first buffer 28A and a second buffer 28B. For example, image data for viewing by the viewer's right eye may be sent to buffer 28A and image data for viewing by the viewer's left eye may be sent to image buffer 28B. In the illustrated embodiment, eyeglasses 40 having an optical shutter may be worn by the viewer. A 3D control 36 controls eyeglasses 40 by way of a transmitter 38 and wireless link 39. 3D control 36 shutters the eyeglasses' left and right eyes $16_L$ and $16_R$, and, in time with this, 3D control 36 controls source select 30 to drive modulators 34 using image data from the buffer corresponding to the opened shutter. In this manner, separate left and right eye images are delivered to the viewer. The shutters on eyeglasses 40 operate quickly enough that the viewer perceives a continuous image with each eye.

One issue with a display such as display 20 of FIG. 1 is that the maximum perceived brightness of the displayed image is different in 2D display mode than it is in 3D display mode. In 3D display mode, each of the viewer's eyes is blocked from seeing the image for approximately half of the time. Consequently, the maximum perceived brightness of an image in 3D display mode is significantly lower than the brightness of the image in 2D display mode where both of the viewer's eyes can see the displayed image at all times.

Not only is the maximum perceived brightness reduced, but the brightness of any displayed pixel in the display is also reduced in 3D display mode for the same reason (i.e. the light from that pixel is only impinging on the viewer's eye for approximately half of the time in 3D display mode whereas the light from the pixel can reach the viewer's eye all of the time in 2D display mode). A consequence of the apparent dimming of the image in 3D display mode is that the perception of colors changes. The human visual system (HVS) responds differently to colors presented at different levels of brightness. In general, as the overall brightness of an image is reduced, colors appear more drab to the HVS.

The above-described embodiment of FIG. 1 describes an active 3D viewing system which includes eyeglasses having an optical shutter. In other embodiments, display 20 may comprise a passive 3D viewing system which uses linear or circular polarization, or Multiview™ technology (spectral separation of left- and right-eye images), for example. In such embodiments, due to the filters on the eyeglasses, the amount of light which reaches each eye may be reduced in 3D display mode as compared to 2D display mode, and color shifts may be introduced by the spectral properties of the spectral or polarizing filters and lenses. For example, in many instances polarizing glasses tend to yield images which appear to the viewer to have a purple hue.

For displays such as those described above, the methods and apparatus described herein may be used to compensate for differences in color and/or brightness in image display when switching between 2D and 3D display modes. For example, where image content has been color-graded for display in 3D display mode, then such image content may be modified for display in 2D display mode by compensating for the increased luminance of 2D image display and/or lack of color shift introduced by the eyeglasses. Similarly, where image content has been color-graded for display in a 2D display mode, then such image content may be modified for display in 3D display mode by compensating for the decreased luminance of 3D image display and/or the color shift introduced by the eyeglasses.

Figure 3:
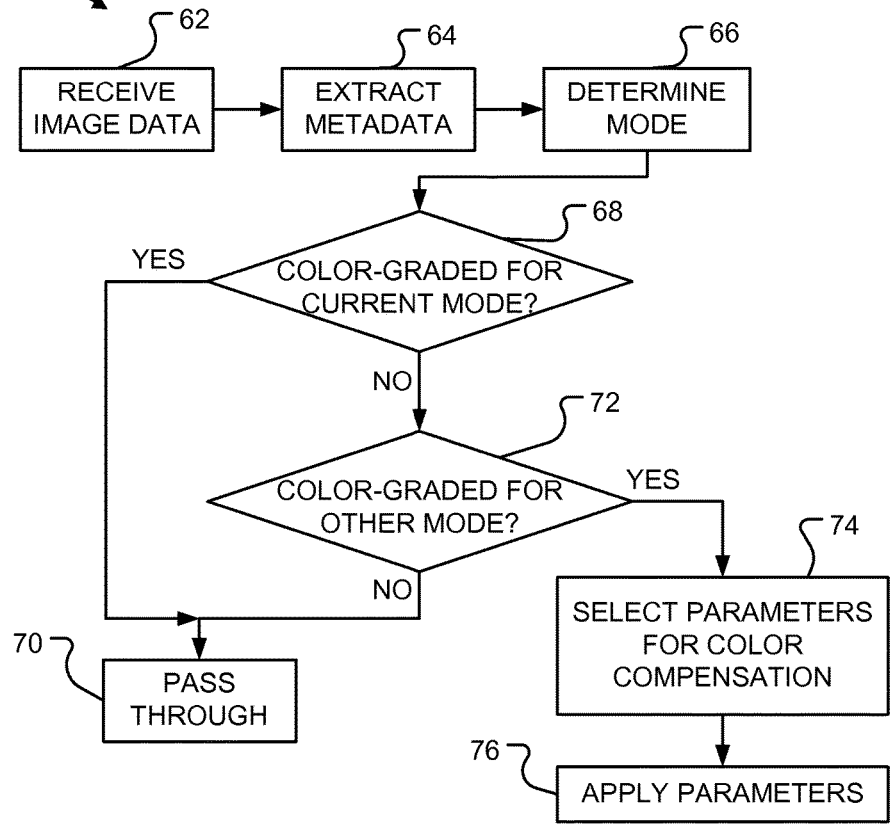
FIG. 3 is a flow chart of a method according to one example embodiment for processing image data to perform color compensation for 2D and 3D display modes.

FIG. 3 illustrates a method 60 according to one embodiment for processing image data to perform color compensation for 2D and 3D display modes. In the illustrated embodiment, method 60 begins at block 62 by receiving image data. Metadata may be provided with the received image data and method 60 may extract such metadata at block 64. The metadata indicates whether the image data has been color-graded for 2D display mode, 3D display mode, or for both 2D and 3D display modes. In some cases the metadata (or lack thereof) may indicate that the image data has not been color-graded for any display mode. The metadata may be embedded in the received image data by any suitable means or may be provided in a separate file, a separate part of a data structure, or a separate communication path.

In block 66 it is determined whether the display is operating in 2D or 3D display mode (i.e. the current display mode is determined). In some embodiments, where the image data includes 3D image content, 3D display mode may be selected manually by the viewer, and an input may be provided from the display indicating the current display mode selected by the viewer. In other embodiments, the display may detect whether 3D display mode has been enabled using one or more of the following techniques, for example: analyzing the image content for 3D image content, determining if the viewer's optically shuttered eyeglasses are enabled or powered on, and/or a camera or other detector pointed at the viewer to detect the presence or absence of 3D viewing eyeglasses.

In block 68 it is determined based on the metadata whether the content of the image data has been color-graded for the current display mode. If so ("yes" branch of block 68), then the image data is passed through at block 70 without processing to correct for a mismatch between the current display mode and the display mode for which the content has been color-graded.

If the content has not been color-graded for the current display mode ("no" branch of block 68), method 60 proceeds to block 72 and determines based on the metadata whether the content has been color-graded for the other display mode. If not (i.e. "no" branch of block 72, as there is no indication that the content has been color-graded for any display mode) then the image data is processed according to block 70. Otherwise, if the content has been color-graded for the other display mode ("yes" branch of block 72) then at block 74 a set of parameters is selected (e.g. from an appropriate look up table) for performing color compensation of the image data. A different set of parameters can be obtained depending upon whether the current display mode is the 2D display mode and the other display mode is the 3D display mode or vice versa. In block 76 the parameters are applied to perform pixel value transformations on the image data.

In other embodiments, assumptions may be made as to which display mode the content has been color-graded for, in the absence of metadata specifying one display mode or the other. For example, at block 72 it may be assumed that the content has been color-graded for display in 2D display mode or in 3D display mode in the absence of metadata.

Block 76 of method 60 may be performed by the pixel value adjustment unit 46 of image processor 26 shown in FIG. 2. Based on the current display mode 49 and the mode for which the content has been color-graded, pixel value adjustment unit 46 selects and applies parameters 50A, 50B to adjust the image data for the current display mode 49. For example, where image content has been color-graded for 2D display mode and the image data is to be displayed in 3D display mode, colors in the image data may be adjusted in a way that makes them appear more vivid and/or brighter in 3D display mode than they would appear otherwise.

Any one of a number of methods may be used to adjust the colors to make them appear more vivid. One method, for example, is to transform the pixel values into a color space in which color saturation can be adjusted directly. The HSV (hue, saturation and value) color space is one such color space. A gain may be applied to the saturation component. For example, the saturation component may be multiplied by a predetermined value (e.g. 1.1). The adjusted pixel values are then transformed back into the target space (e.g. RGB color space).

Another method which may be used, for example, is a saturation technique as described by Christophe Schlick in "Quantization techniques for the visualization of high dynamic range pictures" in Peter Shirley, Georgis Sakas and Stefan Müller, editors, *Photorealistic Rendering Techniques*, pages 7-20, Springer-Verlag Berlin Heidelberg New York, 1994, which is hereby incorporated herein by reference in its entirety.

Still other methods may take into account such factors as, for example, the average image brightness, the mid-tone local contrast (as set by the tone-curve slope), and the minimum and maximum output display luminance.

Figure 4:
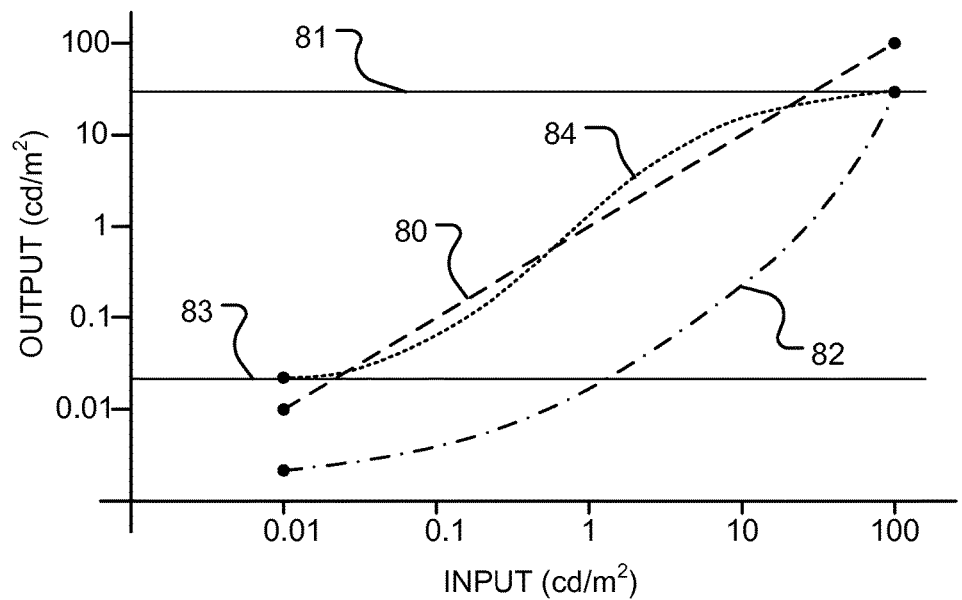
FIG. 4 is a graph showing various relationships between input and output luminance of a display.

The specific transformations performed by pixel value adjustment unit 46 may depend upon the capabilities of the display. FIG. 4 is a graph illustrating possible relationships between the input and output luminance of a display. In a display with perfect fidelity, the input and output luminance values would match exactly as indicated by straight line 80. For example, as shown by line 80, applying an input pixel value to command a brightness of 0.01 cd/m$^2$ (nits) results in an output pixel brightness of 0.01 cd/m$^2$, and applying an input pixel value to command a brightness of 100 cd/m$^2$ results in an output pixel brightness of 100 cd/m$^2$.

In a real display, however, there are limitations in the capabilities of the display. For example, a display may have a maximum output luminance, as indicated by line 81 in FIG. 4. The input luminance values specified by the image data may exceed the maximum output luminance of the display. The maximum output luminance of a display may be accommodated in various ways. For example, the output luminance values may be scaled downward according to the mapping indicated by curve 82. For example, where the display in question has a maximum luminance of 40 cd/m² then an input of 100 cd/m² may be mapped to an output of 40 cd/m². Similarly, an input of 0.01 cd/m² may be mapped to an output of 0.004 cd/m². A mapping according to curve 82 preserves the slope of the relationship between input and output luminance values and therefore preserves details in the middle of the luminance range.

Another way to accommodate the maximum output luminance of a display which is lower than that which may be specified in the pixel values is to clip any input values which exceed the maximum output luminance of the display to the maximum output luminance of the display. This may result in image artifacts. In certain cases however image artifacts caused by clipping are not significant and the overall appearance of the clipped image may be preferable to drawbacks of other methods for accommodating maximum output luminance of the display. For example, some methods that involve scaling down the input luminance values to the output luminance capability of the display may result in decreased image contrast. This may be more objectionable than image artifacts caused by clipping.

In many cases, a display is limited not only in terms of the maximum output luminance that it is capable of displaying, but the display may also have a black level, corresponding to the darkest black it can display. The black level of a display is illustrated by line 83 in FIG. 4. The input luminance values specified by the image data may be lower than the display's black level. One way to accommodate a display which has limitations at both low and high ends of its brightness range is to use a sigmoid curve such as curve 84 in FIG. 4 or another suitable curve to map between input and output luminance values. Sigmoid curve 84 provides the desirable characteristic that contrast is preserved in the middle portion of the range.

Figure 5:
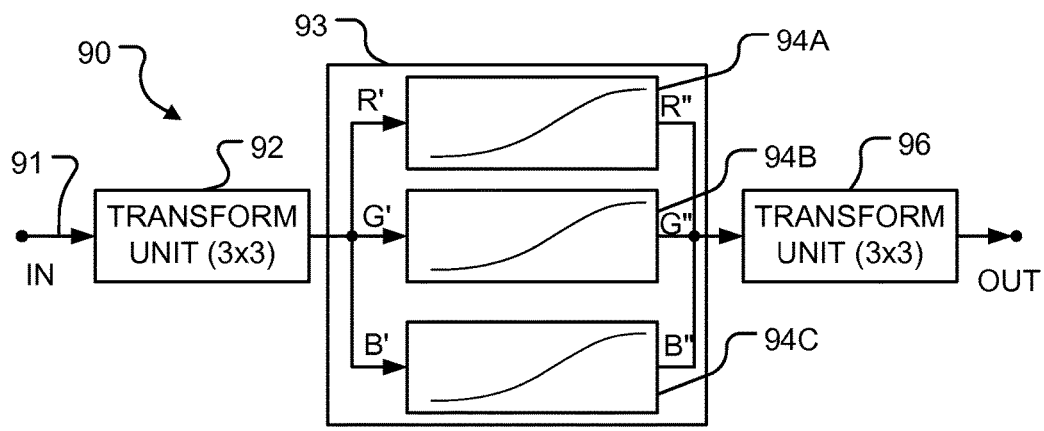
FIG. 5 is a schematic illustration of an image processing component that may perform color manipulation for 3D imaging according to one example embodiment.

Sigmoid curves or other suitable mapping curves may be applied in the R, G, B color space to map input R, G, B values to output R, G, B values for display, to adjust the color and/or brightness when switching between 2D and 3D display modes. For example, sigmoid curves are applied by the image processing component of FIG. 5. FIG. 5 shows an image processing component 90 that may perform color manipulation for 3D imaging at a particular stage in an image processing path. Image processing component 90 of FIG. 5 may comprise a specific implementation of the coordinate transform unit 44 and pixel value adjustment unit 46 of FIG. 2 according to an example embodiment.

In the illustrated embodiment of FIG. 5, image data is received at input 91 and subjected to a 3×3 transformation matrix at first transform unit 92. The outputs of first transform unit 92 are modified R, G, B values (i.e. R', G', B' values) which have been modified to take into account the color shifts which may be introduced by the spectral properties of eyeglasses 40. For example, eyeglasses 40 may include polarizing or spectral filters, optical shutters or other components that introduce color shifts. In the case of "active" eyeglasses 40 which have optical shutters, there may be light leakage which tends to yield images which appear to the viewer to have a purple hue.

R', G', B' values are then provided as input values to a mapping unit 93. Mapping unit 93 applies a sigmoid curve function (which could, for example, be represented by lookup tables 94A, 94B, and 94C for each of the R', G', B' channels, respectively) to map the input R', G', B' values to a set of further modified R, G, B values (i.e. R", G", B"values).

In some embodiments, the sigmoid curve used to map between input and output values is a curve given by the following equation:

$$L_{out} = \frac{c_1 + c_2 L_{in}^n}{1 + c_3 L_{in}^n} \qquad \text{Equation [1]}$$

where $c_1$, $c_2$, and $c_3$ are parameters, $L_{in}$ is the input value, $L_{out}$ is the output value, and n is a parameter that determines the local contrast in the target image. The values for parameters $c_1$, $c_2$, and $c_3$ may be determined based on the capabilities of the display and the characteristics of the image data. For instance, where input luminance is characterised by three values $x_1$, corresponding to the minimum input value (black), $x_2$, corresponding to an intermediate input brightness value, and $x_3$, corresponding to the maximum input value (white), and where output luminance is characterised by three values $y_1$, corresponding to the minimum output value for the display (black), $y_2$, corresponding to a median display output value, and $y_3$, corresponding to the maximum display output value (white), then values for parameters $c_1$, $c_2$, and $c_3$ may be derived from the following formula:

$$\begin{pmatrix} c_1 \\ c_2 \\ c_3 \end{pmatrix} = \frac{1}{x_3 y_3 (x_1 - x_2) + x_2 y_2 (x_3 - x_1) + x_1 y_1 (x_2 - x_3)}$$

$$\begin{pmatrix} x_2 x_3 (y_2 - y_3) & x_1 x_3 (y_3 - y_1) & x_1 x_2 (y_1 - y_2) \\ x_3 y_3 - x_2 y_2 & x_1 y_1 - x_3 y_3 & x_2 y_2 - x_1 y_1 \\ x_3 - x_2 & x_1 - x_3 & x_2 - x_1 \end{pmatrix} \begin{pmatrix} y_1 \\ y_2 \\ y_3 \end{pmatrix}$$

In the illustrated embodiment, the R", G", B" values are provided as input values to a second transform unit 96. Second transform unit 96 applies a further 3×3 transformation matrix to the R", G", B" values. This 3×3 transformation matrix may be configured, for example, to modify the saturation or white point of the resulting signal (i.e. to adjust for color shifts introduced by eyeglasses 40). The output of transform unit 96 is supplied to drive the display. Second transform unit 96 is optional, and in some embodiments, R", G", B" values are supplied for driving the display without this further transformation.

First transform unit 92 and second transform unit 96 are operable to adjust for color shifts introduced by the spectral properties of eyeglasses 40 as discussed above. The illustrated embodiment of FIG. 5 includes two transform units 92, 96 because in adjusting the color of the image data it may be desirable to perform a first set of color-adjustment operations (i.e. at first transform unit 92) before application of a non-linear mapping curve (e.g. as performed by mapping unit 93), and to perform another set of color-adjustment operations (i.e. at second transform unit 96) subsequent to application of the non-linear mapping curve. However, as noted above, second transform unit 96 is optional.

In some embodiments, first transform unit 92 and/or second transform unit 96 may perform a color space conversion to transform the image data from one color space representation to another. For example, where the working color space for pixel value adjustments is the RGB color space, and input image data received at input 91 is not in RGB format, first transform unit 92 may transform the image data into RGB color space. After color adjustments are made to the image data, the second transform unit 96 may then transform the image data to a target color space for display.

In certain embodiments, image processing component 90 may comprise a first transform unit 92 (or other transform unit) which transforms the image data into HSV color space. Certain pixel value adjustments (e.g. increasing the vividness or saturation of the colors) may then be performed in HSV color space.

Image processing component 90 of FIG. 5 may be a component of a display capable of displaying image data in VDR (Visual Dynamic Range) format. VDR format is a video format described in co-owned PCT Application No. PCT/US2010/022700 entitled "EXTENDED DYNAMIC RANGE AND EXTENDED DIMENSIONALITY IMAGE SIGNAL CONVERSION AND/OR DELIVERY VIA LEGACY VIDEO INTERFACES" which is hereby incorporated herein by reference. In some embodiments, the image processing component 90 provided by such display is configured such that the parameters for mapping between input and output values can be adjusted or set for switching between 2D and 3D display modes.

Image processing component 90 may comprise a central processing unit (CPU), one or more microprocessors, one or more FPGAs, image processing circuits, or any other suitable processing unit(s) comprising hardware and/or software configured for functioning as described herein. Image processing component 90 may implement the methods described herein (e.g. as described with reference to FIG. 5) by executing software instructions provided by software functions. Such software functions may be stored in a program memory, but this is not necessary and the software functions may be stored in other suitable memory locations within or accessible to image processing component 90. In some embodiments, one or more of the software functions or portions of the software functions may alternatively be implemented by suitably configured data processing hardware. In other embodiments one or more logic circuits are configured to perform the methods described herein as image data is supplied to the logic circuits.

Some displays include a backlight having a brightness that can be controlled. The backlight illuminates a spatial light modulator, such as an LCD panel. In some embodiments, the maximum brightness of the backlight may be limited differently in 2D and 3D display modes. For example, the backlight may be controlled to be brighter in 3D display mode than in 2D display mode. This helps to reduce the amount by which the image is dimmed when the display is switched into 3D display mode.

In some embodiments, the backlight includes a number of individually controllable light sources or light-emitting elements arranged to illuminate different parts of a spatial light modulator such that the intensity with which the backlight illuminates different pixels of the modulator may be varied from place to place across the modulator according to image data. For example, in regions corresponding to bright parts of an image some of the elements of the backlight may be driven so that the regions of the modulator are strongly backlit, whereas in regions corresponding to shadows or other dark areas of the image, other elements of the backlight may be driven so that the regions of the modulator are illuminated less intensely by the backlight. In some embodiments, drive values for the individually controllable light-emitting elements of the backlight are determined from image data according to an algorithm. Different algorithms may be used for 2D and 3D display modes. For example, the algorithm used to determine drive values for 3D display mode may specify brighter values than would be specified by the algorithm for 2D display mode for the same image data.

In some embodiments, the algorithms used for 2D and 3D display modes are the same, but the driving circuit used to drive the backlight is made more sensitive in the 3D display mode so that the light output is greater in 3D display mode for the same input drive values.

Figure 6:
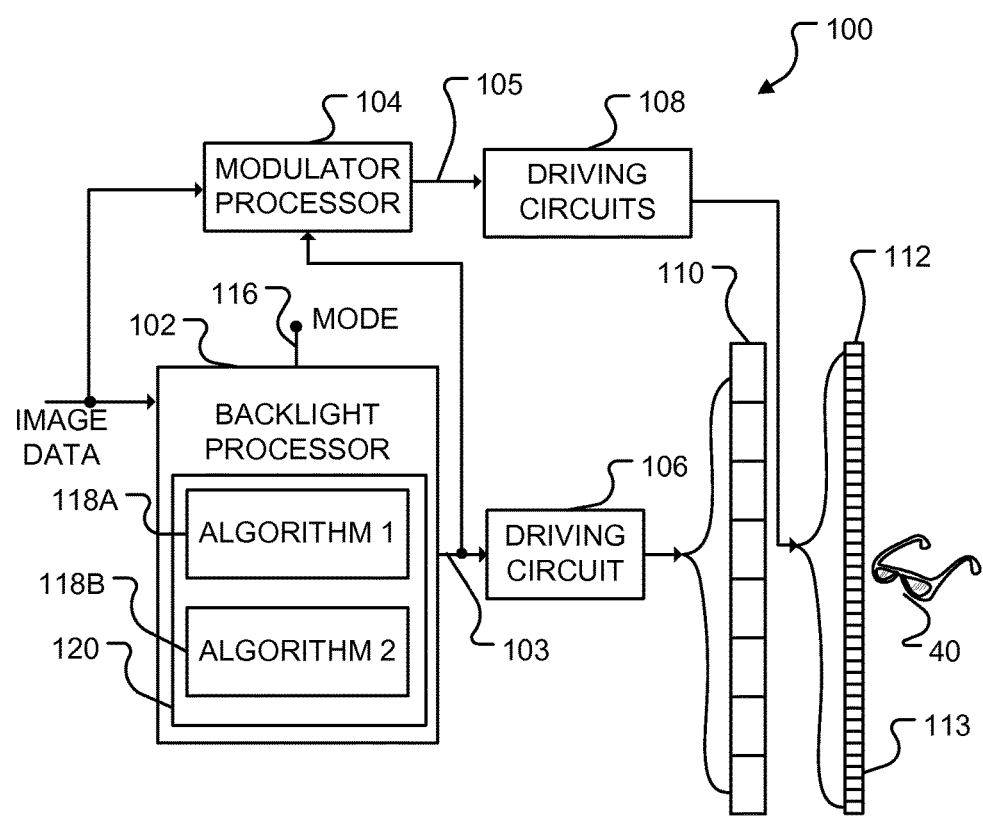
FIG. 6 is a schematic illustration of a display having a locally controllable backlight according to one example embodiment.

FIG. 6 shows a display 100 having a backlight comprising individually controllable light-emitting elements. FIG. 6 shows the end stage components of the display. In FIG. 6, display 100 receives image data which has been processed, for example, as described above (e.g. with reference to FIGS. 2, 3, 4 and 5), to adjust the image data depending on the current display mode. The processed image data is supplied to a backlight processor 102 and a modulator processor 104. Backlight processor 102 generates signals 103 for controlling one or more driving circuits 106 which, in turn, can drive individually controllable light-emitting elements of backlight 110 to emit light to illuminate a modulator 112. The elements of backlight 110 may, for example, be arranged as a two-dimensional array (e.g. in rows and columns or in a hexagonal arrangement).

Modulator processor 104 generates signals 105 which control driving circuits 108 for modulator 112. The image seen by a viewer of display 100 depends upon the amount of light from backlight 110 incident on each pixel 113 of modulator 112 as well as on the degree to which each pixel 113 attenuates the light before passing the light on to a viewer in a viewing area. The transmissivity of pixels 113 (affecting the attenuation of light by the pixel) may be controlled by modulator control signals 105.

In some embodiments, backlight control signals 103 (or a signal containing information similar to signals 103) are passed to modulator processor 104 such that modulator control signals 105 are determined based at least in part on signals 103. For example, modulator processor 104 may perform a light field simulation in order to estimate the amount of light incident on each pixel 113 of modulator 112 for a particular set of driving signals 103 and may generate signals 105 to control each pixel 113 of modulator 112 based in part on the estimate of the amount of light incident on that pixel from the backlight. Examples of displays which work in this general manner are described in PCT Publication Nos. WO03/077013, WO2006/010244, WO2008/092276, WO02/069030, and US Patent Publication No. 2008/0180466, which are hereby incorporated herein by reference in their entireties.

In display 100, backlight processor 102 receives a mode signal at an input 116. The mode signal indicates whether the display is currently in 2D or 3D display mode. Depending upon the mode in which the display is currently operating, backlight processor 102 determines backlight control signals 103 based on one of two algorithms 118A and 118B. In some embodiments, algorithm 118A is used when the display is in 2D display mode and algorithm 118B is used when the display is in 3D display mode. Algorithm 118B differs from algorithm 118A in that algorithm 118B generates backlight control signals 103 which result in greater levels of illumination by backlight 110.

In some embodiments, backlight 110 is of a type that provides separate control of different colors in the backlight such that a white point of the light emitted by the backlight can be shifted. In some such embodiments algorithm 118B shifts the white point in a manner that compensates for color shifts which may be introduced by the spectral properties of eyeglasses 40 (e.g. where eyeglasses 40 include polarizing or spectral filters). Where the backlight is an RGB backlight, the relative intensities of each of the RGB channels may be adjusted using similar methods as described herein for adjusting RGB pixel values (e.g. with reference to FIGS. 2 and 5).

Sudden changes in the color of an image may be distracting to viewers. In some embodiments, changes in image processing may be implemented in successive stages in response to a shift between 2D and 3D imaging modes or vice versa. For example, lookup table values representing color and brightness mappings may be modified in a number of stages to provide changes in imaging processing which are more gradual and therefore less noticeable to viewers.

In some embodiments, modification of color changes may be accomplished in part by operating the display so that after a 2D to 3D switch, 2D image data is shown to both eyes, with an overlap, and the timing of the shutter is changed gradually so that the two eyes gradually begin viewing more of the different left and right images (3D image data) in alternation. Conversely the reverse may be performed after a 3D to 2D switch. In an example embodiment, upon switching from 2D mode to 3D mode, the display is operated to display 2D image data and the shutter is operated to allow both eyes to view the 2D image data during an overlap period. The duration of the overlap period is reduced over time until the images seen by both eyes do not overlap in time. A switch to 3D image data may be performed at a time when the images seen by viewers' left and right eyes are largely non-overlapping. Optionally the 2D and 3D data may are blended during a transition period such that 2D data is displayed for viewing at the start of the transition period, A blend of 2D and 3D data in which the 3D content increases over time and the 2D contend decreases over time is displayed during the transition period. 3D data is displayed after the transition period.

It can be appreciated that the foregoing methods and apparatus may be applied in a manner which permits viewers to set viewing options for a display in a way that will allow the viewers to view both 2D and 3D images consistently.

Switching between 2D and 3D display modes may trigger changes both in the backlight intensity and processing of colors. The changes may be such that the backlight is brighter in 3D display mode and colors are adjusted in a way that make them appear more vivid or brighter in 3D display mode than they would appear otherwise. In some embodiments, switching from 2D to 3D display modes triggers only one of these changes. For example, switching between modes may trigger an increase in backlight intensity or a change in the way that colors are adjusted. In displays according to some other embodiments, the behavior of the display is configurable. For example, a display may be configurable to operate in a low power consumption mode (in which case the backlight intensity is not increased and only color processing is adjusted when switching to 3D display mode); a no-adjustment mode (in which case there is no change to the backlight intensity or color processing when switching to 3D display mode); a backlight compensation only mode (in which case the color processing is not affected but the backlight intensity is increased when switching to 3D display mode); and, a power-optimization configuration mode (in which case both backlight intensity and color processing are changed when switching to 3D display mode).

When viewing 3D content, it may not be desirable to simply increase the backlight intensity to compensate for light loss in 3D display mode, due to the increased power consumption that may result from increasing the backlight intensity. In addition to or instead of adjusting backlight intensity, the image content may be altered (e.g. by increasing the color saturation of the image) to provide the perception of a brighter or more vivid image. FIGS. 7A through 7D illustrate changes in the viewer's perceived colorfulness and luminance of a backlit display 99 for different scenarios. These scenarios include: 2D display mode in FIG. 7A; low-power 3D display mode with no compensation for 3D display mode in FIG. 7B; 3D display mode with compensation provided by adjusting the backlight intensity only in FIG. 7C; and 3D display mode with a combination of backlight intensity adjustment and image color compensation in FIG. 7D. An ammeter 95 is shown in each figure to represent the relative power consumption by display 99 in each scenario. As can be appreciated from these figures, to reduce power consumption when switching to 3D display mode, it is desirable to use a combination of backlight intensity adjustment and image color compensation (FIG. 7D), as opposed to adjusting only the backlight intensity (FIG. 7C).

In dimmer environments, objects tend to appear less colorful to the human visual system. Thus, under the dim viewing conditions of 3D eyeglasses, colored objects may appear duller to the viewer. As noted above, image color saturation may be increased to provide the viewer with the perception of a brighter or more vivid image. Backlight intensity may be balanced with increased image saturation in a manner to prevent clipping, maintain proper white point (e.g. correcting for color shifts introduced by the eyeglasses if necessary), and to stay within desirable power consumption limits. Images which are near color saturation initially may require greater backlight intensity while less saturated images can be adjusted to increase color saturation without requiring as much backlight intensity. In a display with local dimming capabilities, backlight intensity may be increased in regions where the color is more highly saturated.

Aspects of the invention may be provided in the form of a program product. The program product may comprise any non-transitory medium which carries a set of computer-readable information comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable information on the program product may optionally be compressed or encrypted.

Where a component (e.g. a processor, processing component, transform unit, adjustment unit, color mapping unit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for switching a display having a 2D display mode and a 3D display mode, from the 2D display mode to the 3D display mode, the method comprising:
displaying first image data in the 2D display mode;
switching to the 3D display mode;
upon switching to the 3D display mode, performing a color mapping on left and right image data, the left and right image data provided for viewing respectively by viewers' left and right eyes; and
displaying the color-mapped left and right image data on the display,
wherein each of the color-mapped left and right image data comprises image data comprising R, G, B values for display and the color mapping compensates for differences in color and/or brightness between the first image data and the left and right image data upon switching from the 2D display mode to the 3D display mode at least in part by increasing color saturation of the left and right image data.

2. A method according to claim 1 wherein performing the color mapping comprises adjusting colors in the left and right image data to adjust for spectral shifts introduced by viewing eyeglasses used for viewing the left and right image data.

3. A method according to claim 2 wherein performing the color mapping comprises transforming the left and right image data to an RGB color space in which primaries are display primaries as modified by the viewing eyeglasses.

4. A method according to claim 3 wherein performing the color mapping comprises, for the left and right image data in each of the RGB channels, determining an output value according to a corresponding mapping function.

5. A method according to claim 4 wherein the mapping functions are non-linear functions.

6. A method according to claim 5 wherein the mapping functions are sigmoid functions.

7. A method according to claim 6 wherein each of the sigmoid functions have the equation:

$$L_{out} = \frac{c_1 + c_2 L_{in}^n}{1 + c_3 L_{in}^n}$$

where $c_1$, $c_2$, and $c_3$ are parameters based on one or more of the capabilities of the display and the characteristics of the image data, $L_{in}$ is the input value, and $L_{out}$ is the output value.

8. A method according to claim 1 wherein performing the color mapping on the left and right image data comprises transforming pixel values of the left and right image data into a color space in which pixel values have saturation components that can be changed to directly control color saturation and increasing the saturation components of the pixel values in the left and right image data.

9. A method according to claim 8 wherein the color space is an HSV color space.

10. A method according to claim 9 wherein performing the color mapping on the left and right image data comprises, after increasing the saturation components of the pixel values in the left and right image data, transforming the left and right image data into an RGB color space.

11. A display comprising:
an input for receiving image data;
a color mapping unit connected to perform color mapping on received image data;
display driver circuitry connected to display images according to image data processed by the color mapping unit; and
a controller, wherein the controller is configured to control switching between a 2D display mode and a 3D display mode, wherein in controlling switching the controller is configured to:
change color mapping parameters for the color mapping unit; and
switch from displaying first image data to displaying color-mapped left and right image data for viewing respectively by a viewer's left and right eyes, the color-mapped left and right image data each comprising image data comprising R, G, B values for display;
wherein the changed color mapping parameters compensate for differences in color and/or brightness between the first image data and the left and right image data upon switching from the 2D display mode to the 3D display mode at least in part by increasing color saturation of the left and right image data.

12. A display according to claim 11 wherein the color mapping unit is configured to adjust colors in the left and right image data based at least in part on the color mapping parameters.

13. A display according to claim 12 wherein the color mapping unit is configured to transform the left and right image data to an RGB color space prior to adjusting colors in the left and right image data.

14. A display according to claim 13 wherein, for the left and right image data in each of the RGB channels, the color mapping unit is configured to determine an output value according to a corresponding mapping function.

15. A display according to claim 14 wherein, in determining an output value according to a corresponding mapping function, the color mapping unit is configured to apply a non-linear function as the mapping function.

16. A display according to claim 15 wherein, in determining an output value according to a corresponding mapping function, the color mapping unit is configured to apply a sigmoid function as the mapping function.

17. A display according to claim 11 wherein the display comprises a backlight and in controlling the switching to the 3D display mode the controller is configured to control the backlight to be brighter than in 2D display mode.

18. A display according to claim 17 wherein the backlight comprises a plurality of individually-controllable light sources arranged to illuminate different parts of a spatial light modulator wherein drive values for the individually controllable light sources are determined by a first algorithm when the display is in the 2D display mode and by a second algorithm different from the first algorithm when the display is in the 3D display mode.

19. A display according to claim 18 wherein the second algorithm specifies drive values corresponding to brighter illumination than the first algorithm for the same image data.

* * * * *